United States Patent

Yoshida et al.

[11] Patent Number: 5,969,839
[45] Date of Patent: Oct. 19, 1999

[54] OPTICAL COMMUNICATIONS DEVICE

[75] Inventors: Takashi Yoshida; Noboru Kanzaki; Kenji Asanuma; Eiichi Nabeta, all of Kawasaki, Japan

[73] Assignee: Fuji Electric Co., Ltd., Kawasaki, Japan

[21] Appl. No.: 08/939,631

[22] Filed: Sep. 29, 1997

Related U.S. Application Data

[62] Division of application No. 08/500,437, Jul. 10, 1995, Pat. No. 5,729,371.

[51] Int. Cl.$^6$ ................................................. H04B 10/04
[52] U.S. Cl. ............................ 359/152; 357/185; 357/186
[58] Field of Search ................................... 359/180, 184, 359/185, 186, 158, 181; 375/238, 239, 240, 241

[56] References Cited

U.S. PATENT DOCUMENTS

| | | | |
|---|---|---|---|
| 3,209,259 | 9/1965 | Huber | 375/239 |
| 3,899,429 | 8/1975 | Ueno et al. | 359/184 |
| 4,189,756 | 2/1980 | Ninomiya | 360/14 |
| 4,201,909 | 5/1980 | Dogliotti et al. | 359/180 |
| 4,481,677 | 11/1984 | Li et al. | 359/162 |
| 4,584,720 | 4/1986 | Garrett | 375/239 |
| 4,694,504 | 9/1987 | Porter et al. | 359/180 |
| 5,075,792 | 12/1991 | Brown | 359/152 |
| 5,113,278 | 5/1992 | Degura et al. | 359/154 |
| 5,166,952 | 11/1992 | Omurg et al. | 375/1 |
| 5,214,526 | 5/1993 | Tonomura | 359/184 |

FOREIGN PATENT DOCUMENTS

| | | |
|---|---|---|
| 1593992 | 7/1994 | Australia . |
| 3524871 | 1/1987 | Germany . |
| 4114485 | 11/1992 | Germany . |
| 5130046 | 5/1993 | Japan . |

*Primary Examiner*—Rafael Bacares
*Attorney, Agent, or Firm*—Elman & Associates

[57] ABSTRACT

An optical communications device is disclosed which is equipped with a transmission unit adapted to send binary-coded electrical pulse signals to another optical communications device in the form of optical pulse signals. The transmission unit includes a modulator for producing an electrical pulse signal of a narrow pulse width only at each of rising and falling edges in the binary-coded electrical pulse signals and an electro-optic converter for converting the electrical pulse signal of a narrow pulse width into an optical pulse signal of a narrow pulse signal. As an alternative, the transmission unit includes a modulator which produces an electrical pulse signal of a narrow pulse width for each bit in the binary-coded electrical pulse signals only when it is at a high level and an electro-optic converter which converts the electrical pulse signal of a narrow pulse width into an optical pulse signal of a narrow pulse width.

8 Claims, 19 Drawing Sheets

PRIOR ART

OPTICAL COMMUNICATIONS DEVICE

This is a division of application Ser. No. 08/500,437 filed Jul. 10, 1995, now U.S. Pat. No. 5,729,371.

BACKGROUND OF THE INVENTION

1. Field of the Invention

The present invention relates to an optical communications device which is used as an optical information transmitter, receiver, or transmitter-receiver in various optical communications systems.

2. Description of the Related Art

In general, in optical communications systems, it is expected that current consumption will be reduced by reducing the interval of time during which light is emitted at communications time. Thus, a reduction in the interval of time during which light is emitted is very useful for battery-powered terminal equipment in particular. A system involving such terminal equipment is an industrial instrumentation/control system such as an optical-fiber-based instrumentation system.

FIG. 1 is a block diagram of a conventional optical communications device which sends and receives optical information. This device is terminal equipment which is constructed from a communications LSI 2, a transmitter circuit 3, and a receiver circuit 4 to send and receive optical information over an optical fiber 5. That is, optical digital information sent over the optical fiber 5 from another optical communications device is converted into electrical information by an opto-to-electrical (O/E) converter 4A in the receiver circuit 4, and then applied to the succeeding communications LSI 2. The LSI performs predetermined processes, such as serial-to-parallel conversion, on the electrical information from the receiver circuit 4. At transmission time, on the other hand, electrical information produced by the LSI 2 is converted into optical information by the transmitter circuit 3 and then sent to another optical signal transmission device over the optical fiber 5.

FIGS. 2A, 2B and 2C are timing diagrams for use in explanation of the operation of the optical communications device shown in FIG. 1. More specifically, FIG. 2A shows original electrical pulse signals at the transmitting end, FIG. 2B shows optical pulse signals sent over the optical fiber 5, and FIG. 2C shows electrical pulse signals output from the O/E converter 4A at the receiving end. From these figures it is clear that the original electrical pulse signals at the transmitting end (FIG. 2A) are converted into equivalent optical pulse signals (FIG. 2B), that is, each electrical pulse signal is converted into a corresponding optical pulse signal such that its optical intensity level is proportional to the voltage level of the electrical signal. The optical pulse signals (FIG. 2B) sent over the optical fiber 5 are converted into the equivalent electrical pulse signals (FIG. 2C) by the O/E converter 4A at the receiving end, that is, each optical pulse signal with an optical intensity level is converted into a corresponding electrical pulse signal having a voltage level proportional to that optical intensity level, so that the original electrical pulse signals from the transmitting end are recovered unchanged.

At this point, there is no difference in waveform between the original electrical signal to be sent and the corresponding optical signal being transmitted; thus, in order to emit light at the transmitting end, it is required to supply an optical emitting device, such as an optical emitting diode (LED), with a high current for an interval of time that is equal to the interval of time that each original electrical pulse signal (FIG. 2A) is at the high level.

In the industrial-instrumentation/control-system-oriented communications standard, "Field Bus", that is now in the process of being standardized, a signal in the Manchester coding form is sent at a rate of 31.25 kbps (31.25 kilobits per second). Here, in the Manchester coding, data is coded such that the positive- or negative-going transition takes place in the middle of each bit period, and the positive-going transition represents data "0", while the negative-going transition represents data "1". Therefore, it is required to supply the optical emitting diode with a current for optical emission during the half of the period of time (32 microseconds) required to transmit one bit of data. For example, supposing that the current required to emit light is 16 milliamperes, the current consumption when five bits of data are sent as shown in FIG. 2A will be 32 (microseconds)×½×5 (bits)×16 (milliamperes)=80 (microseconds)×16 (milliamperes).

Thus, in the prior art, optical information sent from the transmitting end and electrical information to be transmitted to the receiving end have the same waveform and a high current flows through an optical emitting diode when the original electrical information is at a high level; thus, the problem with terminal equipment in which communications is frequently made is its power consumption. As a result, with battery-powered terminal equipment in particular required to reduce power consumption, it is difficult to use such a communications system as described above as it is necessary to frequently replace or recharge the battery.

SUMMARY OF THE INVENTION

It is an object of the present invention to provide an optical communications device which reduces power consumption and permits long-term operation even with a limited energy source such as a battery.

According to a first aspect of the present invention, as set forth in claim 1, an optical communications device equipped with a transmitting unit which sends binary-coded electrical pulse signals to an external optical communications device in the form of optical pulse signals, is characterized in that the transmitting unit includes a modulator for producing an electrical pulse signal of a narrow pulse width only at each of rising and falling edges in the binary-coded electrical pulse signals, and an electro-optic converter for converting the electrical pulse signal of a narrow pulse width into an optical pulse signal of a narrow pulse width. Of course, the optical communications device may include a receiving unit in addition to the transmitting unit. In addition, an optical communications device which has only a receiving unit for receiving and demodulating optical pulse signals sent from another optical communications device is also included within the scope of the present invention.

Thus, if, only at each of rising and falling edges in original electrical pulse signals, a corresponding optical pulse signal of a narrower pulse width is sent, such optical pulse signals can be readily converted into the original electrical pulse signals, permitting optical communication without any difficulties. Moreover, since, in this case, the transmitting end is required to produce an electrical pulse signal of a narrow pulse width only at each original electrical pulse signal edge, it becomes possible to substantially reduce the interval of time that a optical-emitting device, such as an optical-emitting diode (LED), emits light, thereby achieving low power consumption. As a result, even if the optical communications device of the present invention is used as battery-powered terminal equipment, the need of replacing or charging frequently a battery used is eliminated, permitting continuous use of the terminal equipment over long periods.

According to a second aspect of the present invention, as set forth in claim 11, an optical communications device equipped with a transmitting unit which sends binary-coded electrical pulse signals to an external optical communications device in the form of optical pulse signals, is characterized in that the transmitting unit includes a modulator for producing an electrical pulse signal of a narrow pulse width for each bit in the binary-coded electrical pulse signals only when it is at a high level, and an electro-optic converter for converting the electrical pulse signal of a narrow pulse width into an optical pulse signal of a narrow pulse width. Of course, the optical communications device may include a receiving unit in addition to the transmitting unit. In addition, an optical communications device which has only a receiving unit for receiving and demodulating optical pulse signals sent from another optical communications device is also included within the scope of the present invention.

Thus, even if an optical pulse signal of a narrower pulse width is sent for each bit in the original electrical pulse signals only when it is at a high level, such optical pulse signals can be readily converted into the original electrical pulse signals, permitting optical communications without any difficulties. Moreover, since, in this case, the transmitting end is required to produce an electrical pulse signal of a narrow pulse width only when the corresponding electrical pulse signal is at a high level, it also becomes possible to substantially reduce the interval of time that an optical-emitting device emits light, thereby achieving low power consumption. The optical communications device of the second aspect will therefore have the same advantages as the optical communications device of the first aspect.

In general, optical communications are said to be immune to noise. However, it is also considered that noise originates in a section that converts optical signals into electrical signals and adversely affects the receiving operation.

If, when the receiving unit which receives optical pulse signals of a narrow pulse width sent from the transmitting unit according to the first aspect is constructed, as set forth in claims 2, 3, etc., from an opto-electrical converter for converting the optical pulse signals into electrical pulse signals of a narrow pulse width, and a demodulator responsive to each electrical pulse signal of a narrow pulse width output from the opto-electrical converter for producing a level-inverted electrical pulse signal to thereby recover an original electrical pulse signal, a noise which is substantially the same as an electrical pulse signal of a narrow width originates in the opto-electrical converter, then such a noise will also invert the output level of the demodulator, resulting in failure to recover the original electrical pulse signals. Such a problem will be described later in detail. Thus, it is desired that the following improvements be made to the demodulator as countermeasures against a malfunction caused by such a noise.

The first countermeasure against noise is that the demodulator sets its output level to a certain level during non-reception time, in the event that no electrical pulse signal is output from the opto-electrical converter for a fixed interval of time. The fixed interval of time should preferably be more than the interval of a bit in transmission data, but less than 1.5 times the bit interval. By so doing, the output level of the demodulator can be returned to this level during non-reception time, after a lapse of the fixed interval of time even if, during non-reception time, noise originates to cause the demodulator to invert its output level, thus ensuring the proper subsequent receiving operation and circumventing a malfunction due to noise.

The second countermeasure against noise is that the demodulator inverts-its output level only once when two or more electrical pulse signals are output from the opto-electrical converter within a fixed interval of time. The fixed interval of time should preferably be substantially less than half the interval of a bit in transmission data. By so doing, even when noise originates during reception time, it is counted as one of the two or more electrical pulse signals which are output within the fixed interval of time. Thus, the output level of the demodulator is inverted only once and no level inversion due to noise takes place, permitting a malfunction due to noise to be circumvented.

The third countermeasure against noise is to use the first and second countermeasures in combination. By so doing, even if noise originates during non-reception time or reception time, a malfunction due to the noise can be circumvented.

BRIEF DESCRIPTION OF THE DRAWINGS

Other features and advantages of the invention will be apparent from the description of the preferred embodiments of the invention in conjunction with the accompanying drawings, in which.

DETAILED DESCRIPTION OF THE PREFERRED EMBODIMENTS

Figure 3:
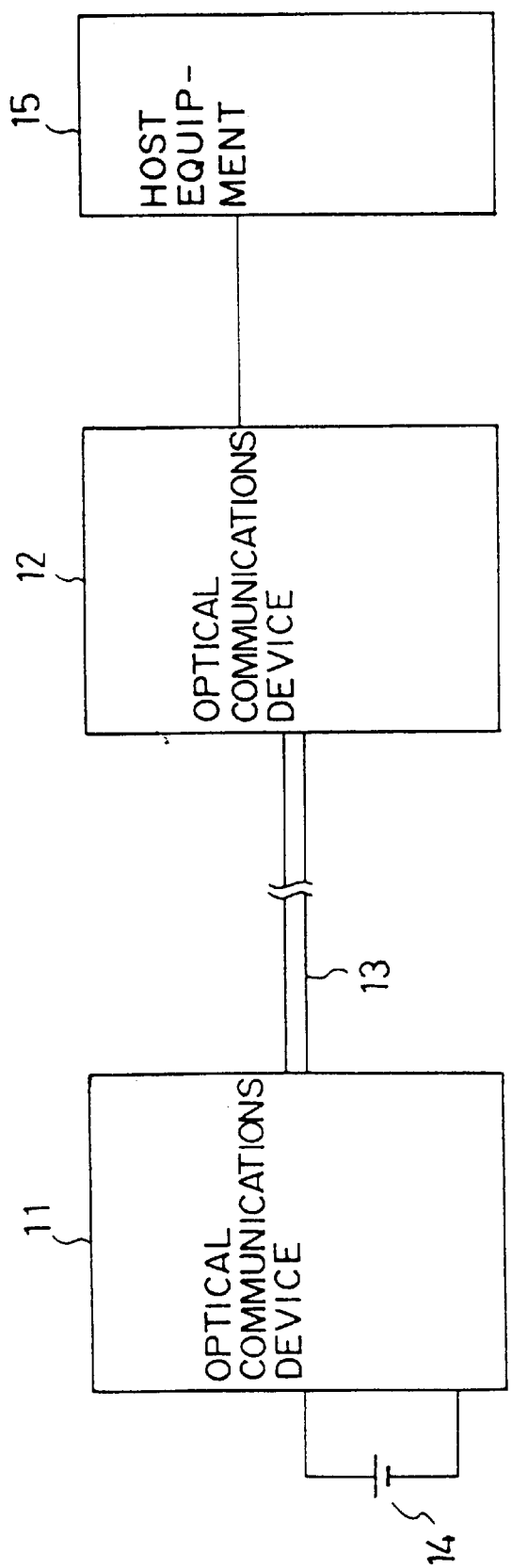
FIG. 3 is a system block diagram illustrating an example of a mode of use of an optical communications device embodying the present invention.

As shown in FIG. 3, optical communications devices 11 and 12 of the present invention are linked together by an optical fiber 13. In this figure, the optical communications device 11 is used as terminal equipment that can be powered by a battery 14, while the other device 12 is connected to a host equipment 15. Although, in FIG. 3, a one-to-one connection configuration is shown in which a pair of optical communications devices 11 and 12 are connected by a single optical fiber 13, an N-to-M (N and M are each integers of one or more) connection configuration is also possible. In addition, instead of being transmitted by the use of an optical fiber, optical information can also be transmitted through space (i.e., wireless transmission). Thus, the optical communications device of the present invention can take various different modes of use according to its purposes and applications.

Figure 4:
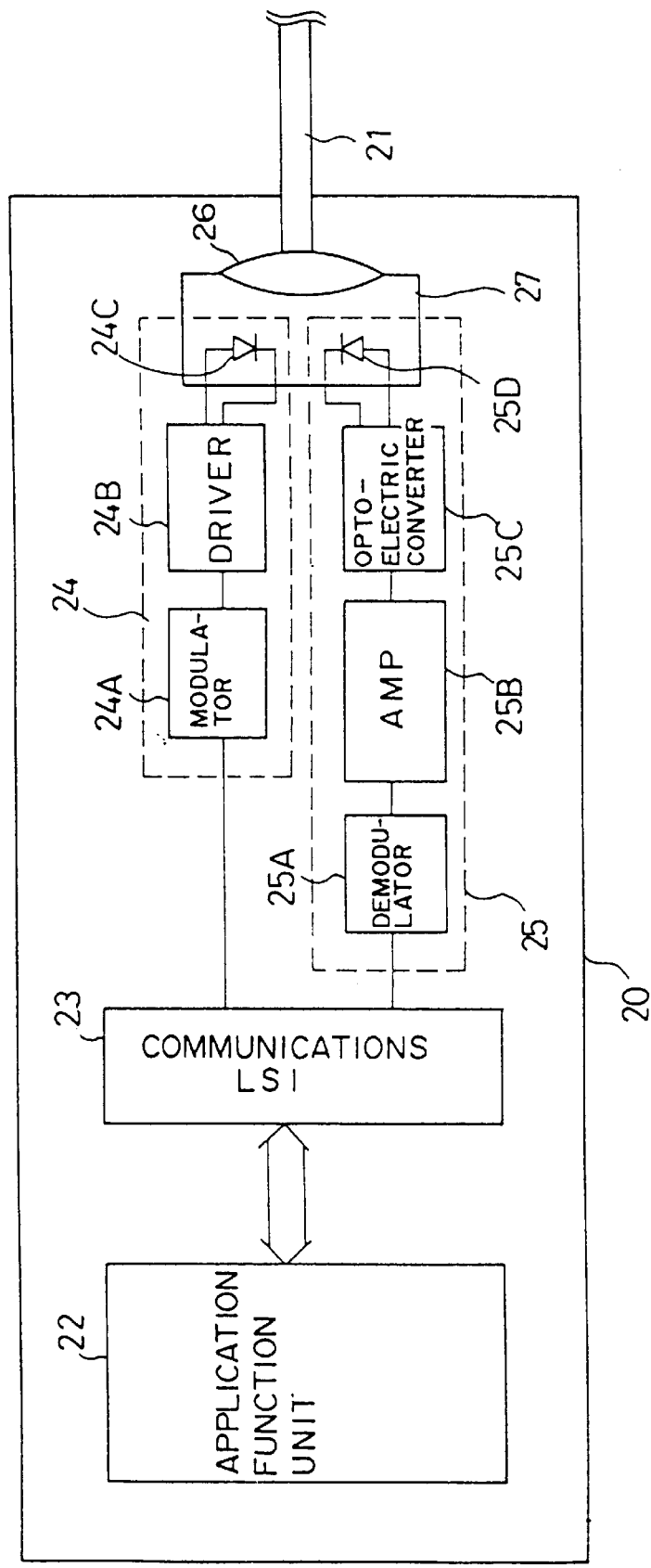
FIG. 4 is a block diagram of an optical communications device according to a first embodiment of the present invention.

In FIG. 4, there is shown, in block diagram form, an optical communications device 20 according to a first embodiment of the present invention. This transmission device 20 is adapted to two-way optical communications with an external optical communications device through a single optical fiber 21, and comprises an application function unit 22, a communications LSI 23, a transmitter circuit 24, and a receiver circuit 25. The application function unit 22 provides various functions required for the original purposes of the equipment, such as sensing, computation, display, transmission control, etc. The communications LSI 23 carries out predetermined processing, including serial-to-parallel conversion. The transmitter circuit 24 is constructed from a modulator 24A, a driver 24B, and an optical-emitting device 24C, while the receiver circuit 25 is constructed from a demodulator 25A, an amplifier 25B, an opto-electrical converter 25C, and an optical receiving device 25D. The optical-emitting device 24C and the optical-receiving device 25D are combined together with a condenser lens 26 placed at the end of the optical fiber 21 as one unit, i.e., an integrated optical emitting/receiving device 27. Of course, such an integrated device is not necessarily required.

When the optical communications device 20 sends optical information to an external device, the application function unit 22 first sends to the communications LSI 23 electrical information that conforms to a predetermined format. The communications format in this case varies between serial communications and parallel communications. The electrical information is subjected to a process of coding for transmission in the communications LSI 23 and then applied to the transmitter circuit 24. As the coding process, use may be made of a well-known coding process such as the Manchester coding, NRZ coding, or the like. An example of the Manchester coding is illustrated in FIG. 5A, in which items of data "1", "1", "0", "0", and "1" are converted into electrical pulse signals in accordance with the Manchester coding scheme.

Figure 1:
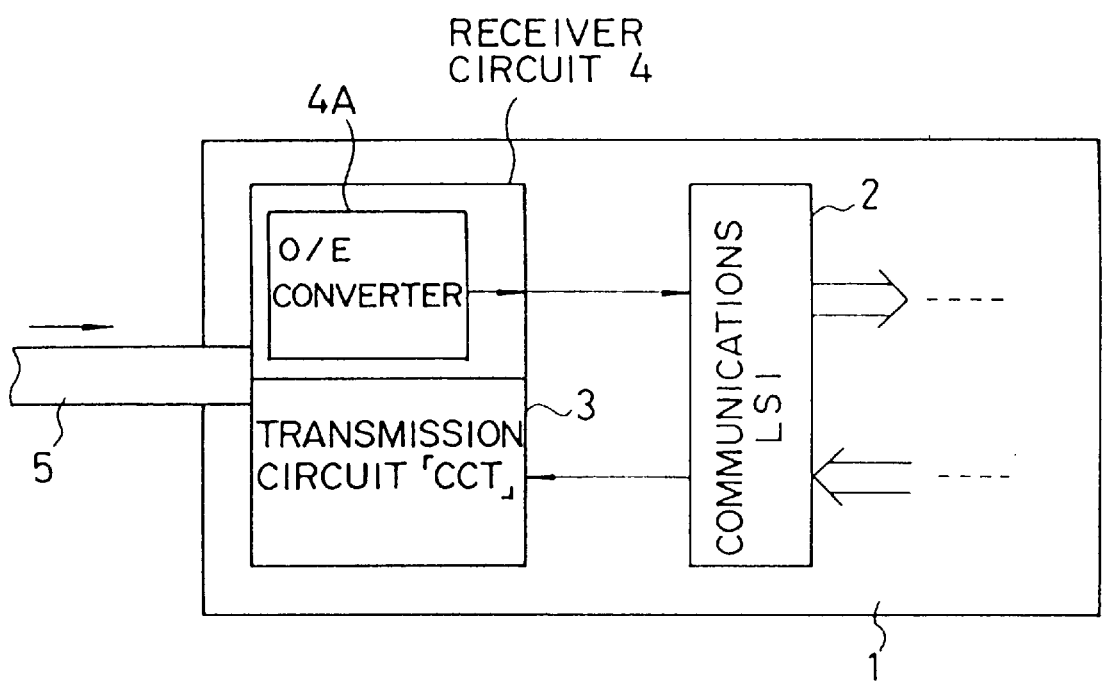
FIG. 1 is a block diagram of a conventional optical communications device which sends and receives optical information.
Figure 2:
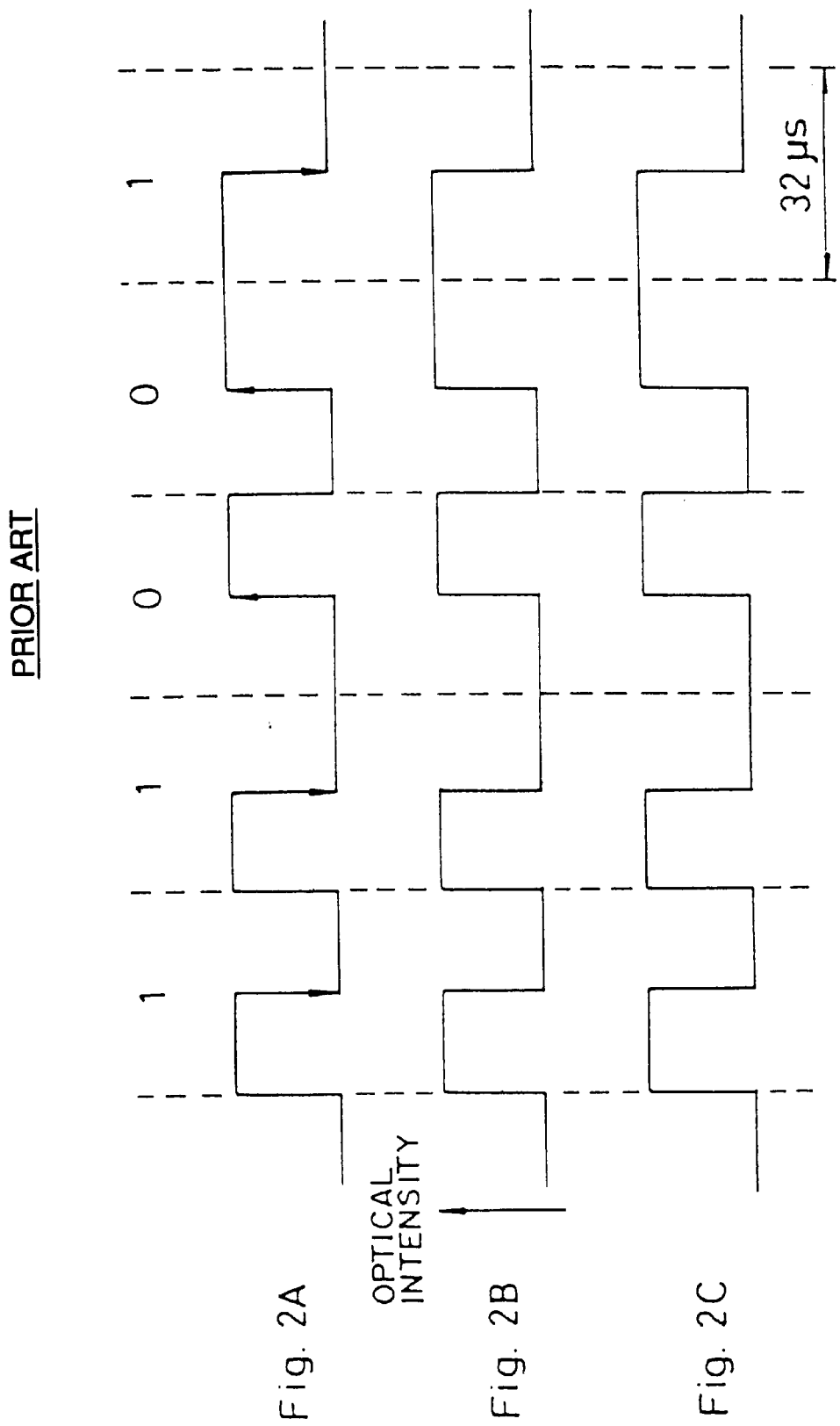
FIGS. 2A, 2B and 2C are timing diagrams for use in explanation of the operation of the conventional optical communications device of FIG. 1.

As described previously, the conventional device is adapted to send optical pulse signals identical in shape to original electrical pulse signals, as shown in FIGS. 2A, 2B and 2C. In the present embodiment, the transmitter circuit 24 is equipped with the modulator 24A that generates an electrical pulse signal having a very narrow pulse width (duration) only at each of the rising and falling edges of Manchester-coded electrical pulse signals, for the purpose of reducing power consumption. For example, the modulator is comprised of two monostable multivibrators 31 and 32 and an OR gate 33 as shown in FIG. 6. That is, the input to the modulator is connected, on the one hand, to the input $\overline{A}$ of the multivibrator 31 and, on the other hand, to the input B of the multivibrator 32. The multivibrators 31 and 32 have their outputs connected to the inputs of the OR gate 33 whose output is taken as the output of the modulator 24A. The multivibrator 31 has its input B connected to a signal at a high level (VDD). Upon receipt of a falling edge of a trigger signal at the input $\overline{A}$, the multivibrator 31 produces at its output Q a pulse signal having a very short duration that is determined by a capacitor 34 and a resistor 35. On the other hand, the multivibrator 32 has its input $\overline{A}$ connected to a signal at a low level (ground potential). In response to the rising edge of a trigger signal, therefore, the multivibrator 32 produces at its output Q a pulse signal having a very short duration determined by a capacitor 36 and a resistor 37. Thus, when the Manchester-coded electrical pulse signals shown in FIG. 5A are applied to the modulator 24A, an electrical pulse signal of a very narrow width will be output from the modulator 24A only at each of the rising and falling edges the electrical pulse signals as shown in FIG. 5B. To reduce power consumption, it would be desired that the duration of a pulse signal output from each of the multivibrators 31 and 32 be as short as possible. In practice, however, it is set to, for example, 2 microseconds, considering terms of transmission specifications and receiver performance, etc.

Figures 5A, 5B, 5C, 5D, 5E:
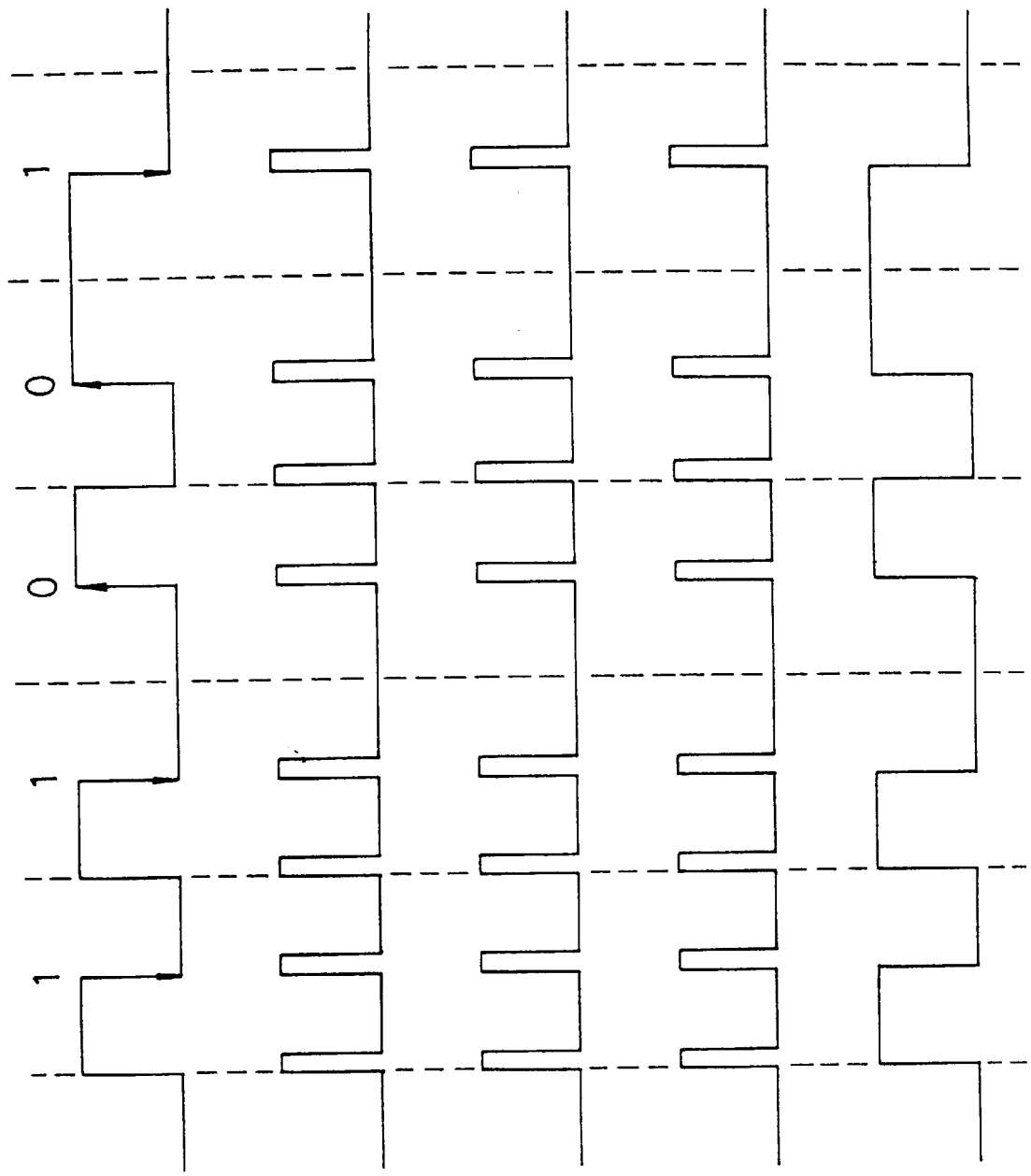
FIGS. 5A through 5E are timing diagrams for use in explanation of the operation of the optical communications device of FIG. 4.
Figure 6:
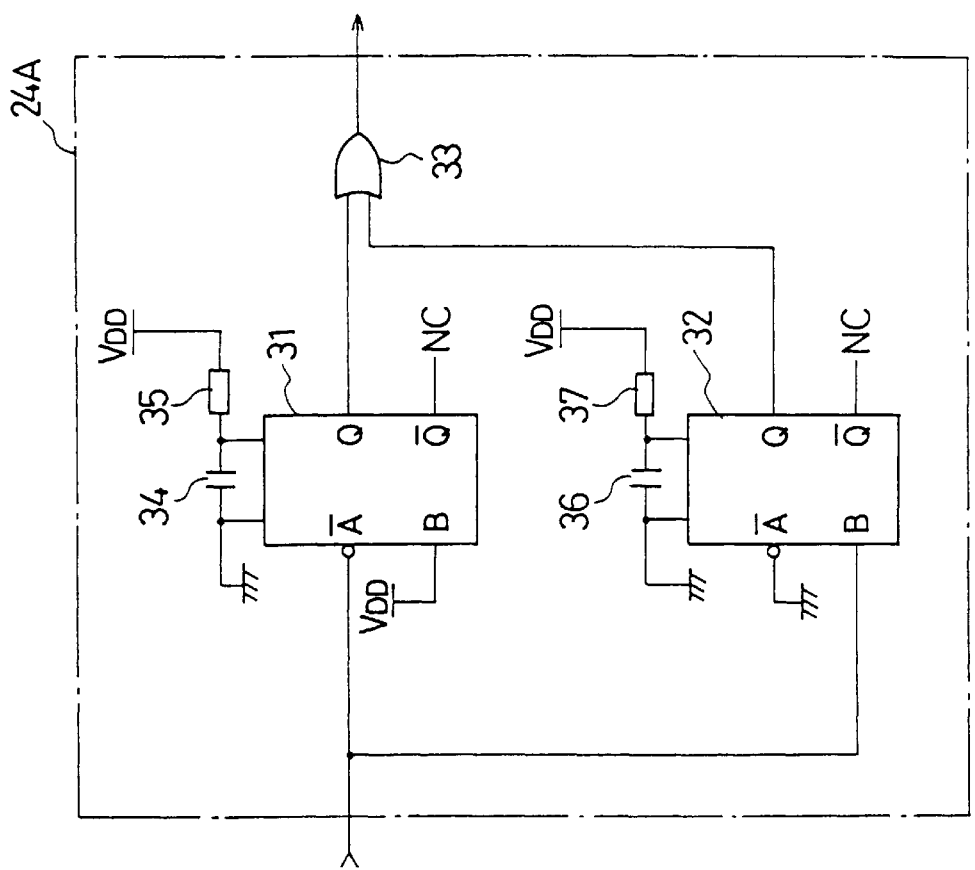
FIG. 6 is a circuit diagram of the modulator of FIG. 4.

The electrical pulse signals (FIG. 5B) of a very narrow width thus produced in the modulator 24A are converted by the electro-optic converter comprised of the driver 24B and the optical-emitting element 24C, into equivalent optical pulse signals as shown in FIG. 5C, which are then sent to the external optical communications device over the optical fiber 21.

In this case, the interval of time during which the optical-emitting element 24C is allowed to emit light is equal to the duration of each optical pulse signal (FIG. 5C). Thus, it becomes possible to substantially reduce current consumption associated with the optical-emitting element 24C emitting light, in comparison with the prior art in which electrical signals are converted into equivalent optical signals. For example, suppose that a current required for optical emission is 16 milliamperes, and the duration of a optical pulse signal is 2 microseconds. Then, the current consumption required to send five bits of data (eight optical pulse signals) as shown in FIGS. 5A to 5C will be 2 (microseconds)×8×16 (mA)=16 (microseconds)×16 (mA). It will therefore be understood that the present embodiment allows the current consumption to be one-fifth of than that in the prior art as shown in FIGS. 2A to 2C. As a result, low power consumption is achieved and hence, even when the optical communications device of the present embodiment is used in battery-powered terminal equipment like the optical communications device 11 in FIG. 3, the continuous use of it over long periods is possible without need of replacing or recharging the battery.

On the other hand, in receiving optical pulse signals of a narrow width sent from the external optical communications device, the optical communications device 20 converts the optical pulse signals into electrical pulse signals of a narrow width by the use of the opto-electrical conversion unit, comprising the optical receiving element 25D and the opto-electrical conversion circuit 25C, and then amplifies the resulting electrical pulse signals by the amplifier 25B, thus obtaining such electrical pulse signals having a narrow width as shown in FIG. 5D. Then, the electrical pulse signals are applied to the demodulator 25A, so that such original electrical pulse signals as shown in FIG. 5E are recovered. The recovered pulse signals are then applied the communications LSI 23.

Figure 7:
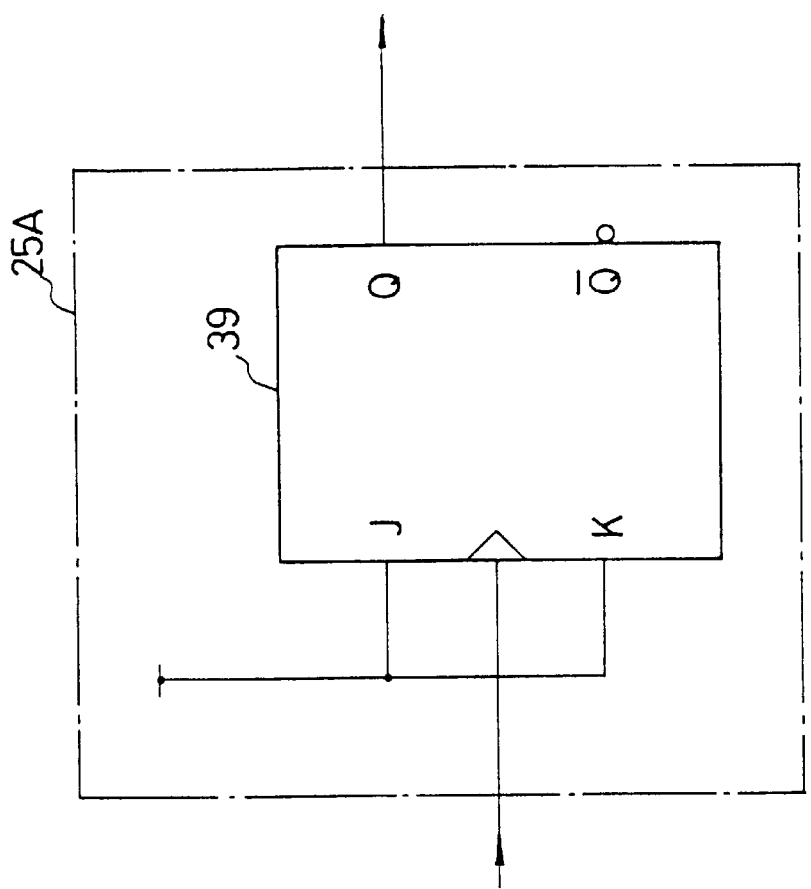
FIG. 7 is a circuit diagram of the demodulator of FIG. 4.

FIG. 7 shows an example of the demodulator 25A. In this example, the demodulator comprises a single flip-flop 39 which has each of its inputs (J, K) set to a high level, i.e., which is placed in the toggle state. That is, the flip-flop is configured such that its output level is inverted at each input pulse. Thus, the application of such electrical pulse signals as shown in FIG. 5D to the demodulator will produce such electrical pulse signals as shown in FIG. 5E, because the flip-flop output state is inverted at each input pulse.

Note here that the communications LSI 23 shown in FIG. 4, for which a large-scale integrated circuit (LSI) is normally used, may be replaced by a generalpurpose microcomputer.

Figure 8:
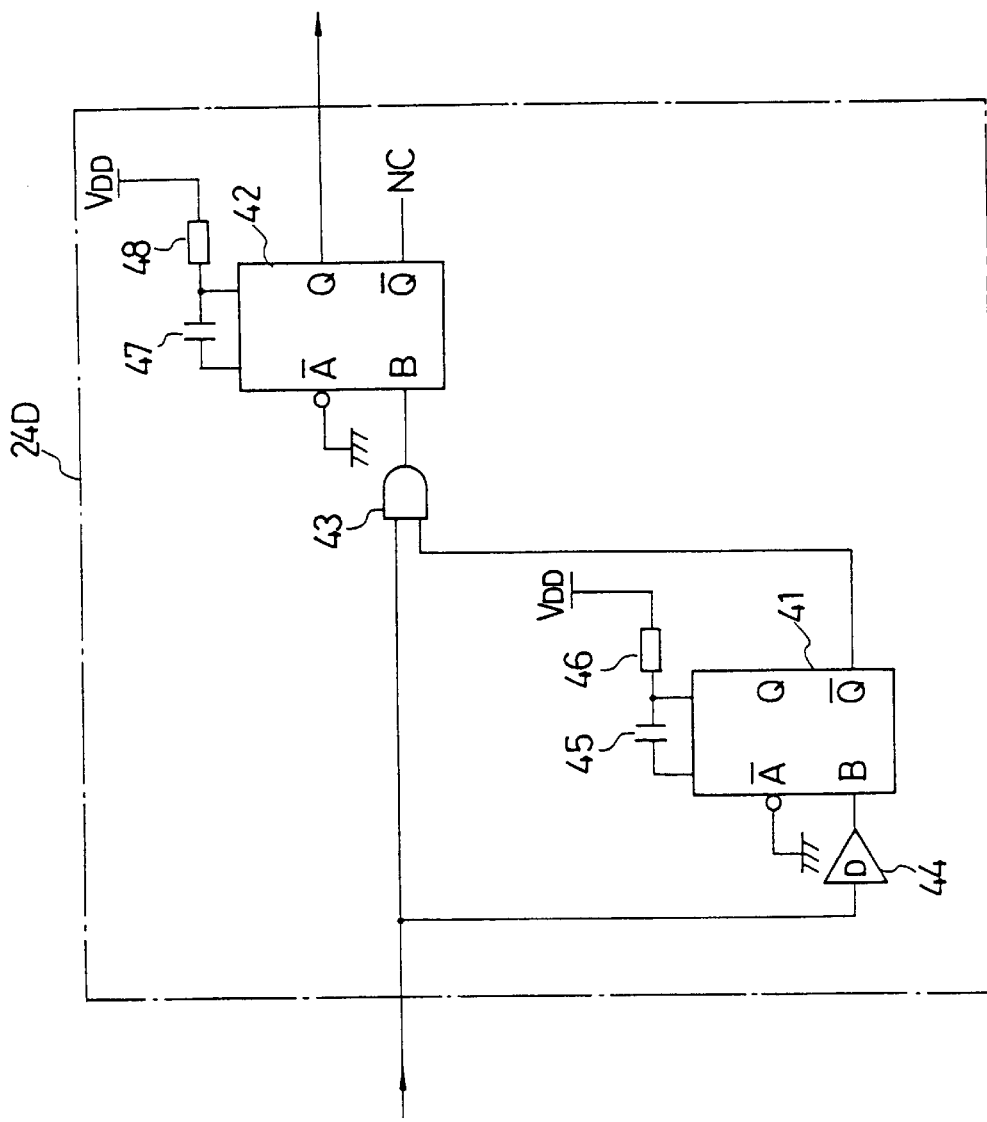
FIG. 8 is a circuit diagram of a modulator used in an optical communications device according to a second embodiment of the present invention.

Next, a second embodiment of the present invention will be described, which is modified from the arrangement of FIG. 4 such that the modulator 24A is replaced by a modulator 24D shown in FIG. 8 and the demodulator 25A is replaced by a demodulator 25E shown in FIG. 9.

Figure 10:
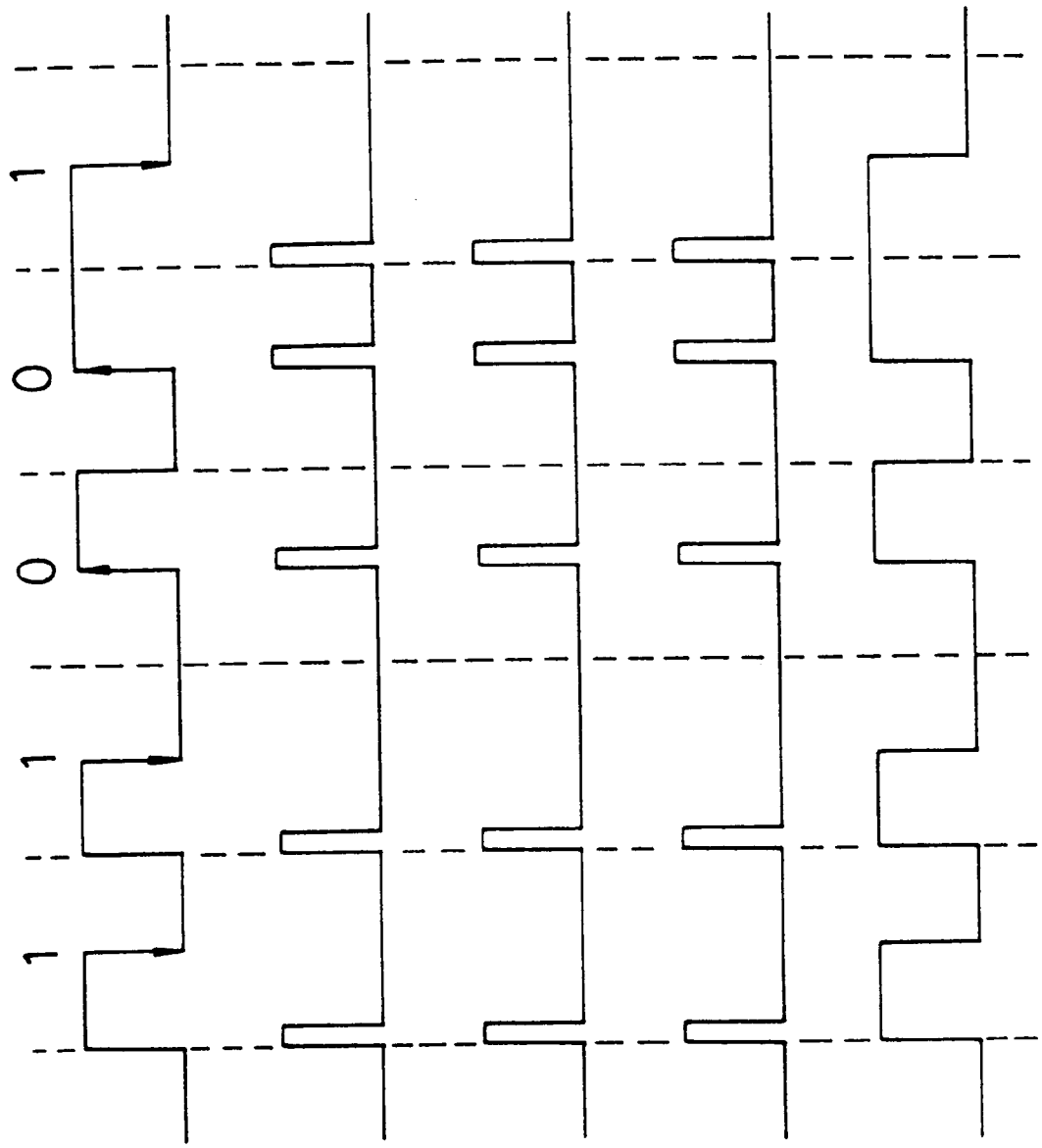
FIGS. 10A through 10E are timing diagrams for use in explanation of the operation of the optical communications device according to the second embodiment of the present invention.

The modulator 24D is a circuit which is responsive to the application of such Manchester-coded electrical pulse signals as shown in FIG. 10A, to output an electrical pulse signal of a narrow width only when each pulse signal (FIG. 10A) corresponding to one bit is at a high level, and comprises two monostable multivibrators 41 and 42, an AND gate 43, and a delay element 44. The input of the modulator 24D is connected, on the one hand, to an input of the AND gate 43 and, on the other hand, to an input B of the multivibrator 41 through the delay element 44. The output of the multivibrator 41 is connected to the other input of the AND gate 43, the output of which is connected to the input B of the multivibrator 42, which provides at its output Q an modulated output.

Figure 11:
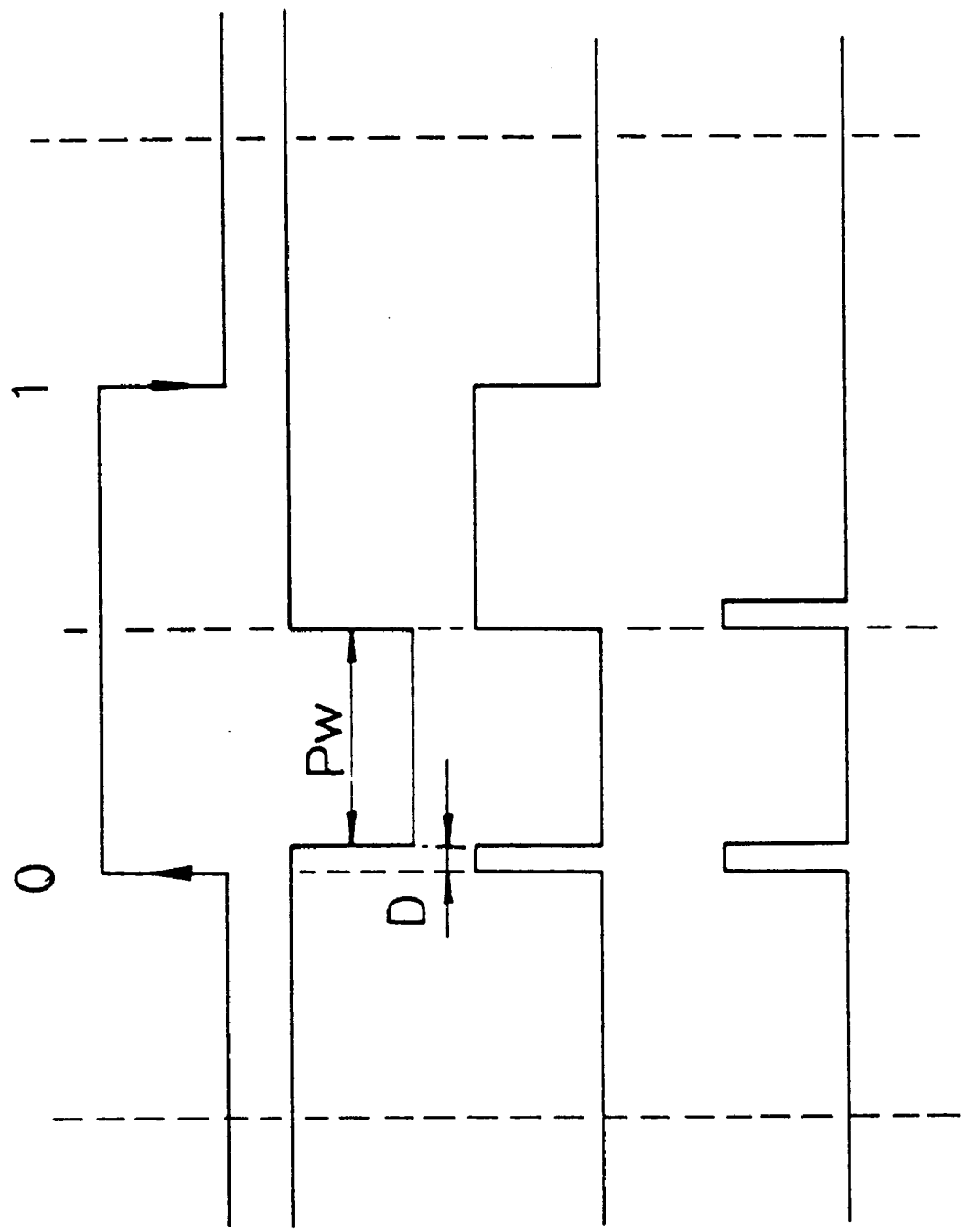
FIGS. 11A through 11D are timing diagrams for use in explanation of the operation of the modulator shown in FIG. 8.

The multivibrator 41 has its input $\overline{A}$ connected to a signal at a low level (ground potential) and responds to an input rising (positive-going) edge to its input B through the delay element 44, to provide at its output $\overline{Q}$ a negative-going electrical pulse signal having a pulse width (duration) Pw determined by the capacitor 45 and the resistor 46. More specifically, when an electrical pulse signal shown in FIG. 11A is applied to the modulator 24D, the multivibrator 41 produces at its output $\overline{Q}$ a negative-going pulse of the pulse width Pw which is delayed by a short time interval D provided by the delay element 44, with respect to the rising edge of that electrical pulse signal as shown in FIG. 11B. The duration Pw of the negative-going pulse is set to be equal to half of the one-bit period minus the delay time D as shown in FIG. 11B. The multivibrator 42, having its input $\overline{A}$ connected to ground, responds to an input rising edge to its input B to provide at its output $\overline{Q}$ a pulse signal having a narrow pulse width determined by the capacitor 47 and the resistor 48. That is, when supplied with the electrical pulse signal (FIG. 11A) and the corresponding output signal of the multivibrator 41 (FIG. 11B), the AND gate 43 outputs as shown in FIG. 11C, a pulse signal whose pulse width from the rising edge of the electrical pulse signal (FIG. 11A) is equal to the delay time D and a pulse signal whose pulse width from the bit boundary is equal to half the bit period. Each time the AND gate output goes high, the multivibrator 42 outputs a pulse signal of a narrow pulse width as shown in FIG. 11D. Thus, when the Manchester-coded electrical pulse signals shown in FIG. 10A are applied to the modulator 24D, an electrical pulse signal of a narrow width will be output from the modulator for each bit in the electrical pulse signals, only when the corresponding signal value is a high level as shown in FIG. 10B. That is, when an electrical pulse signal input to the modulator corresponds to data "1", an electrical pulse signal of a narrow width is produced at a bit boundary. When an input signal corresponds to data "0", on the other hand, an electrical pulse signal of a narrow width is produced at the middle point of the bit period (the interval of a bit). In the present embodiment as well, it is desired that the duration of each pulse signal output from the multivibrator 42 be as short as possible; however, it is set to, for example, 2 microseconds, taking transmission specifications and receiver performance into consideration.

Figure 9:
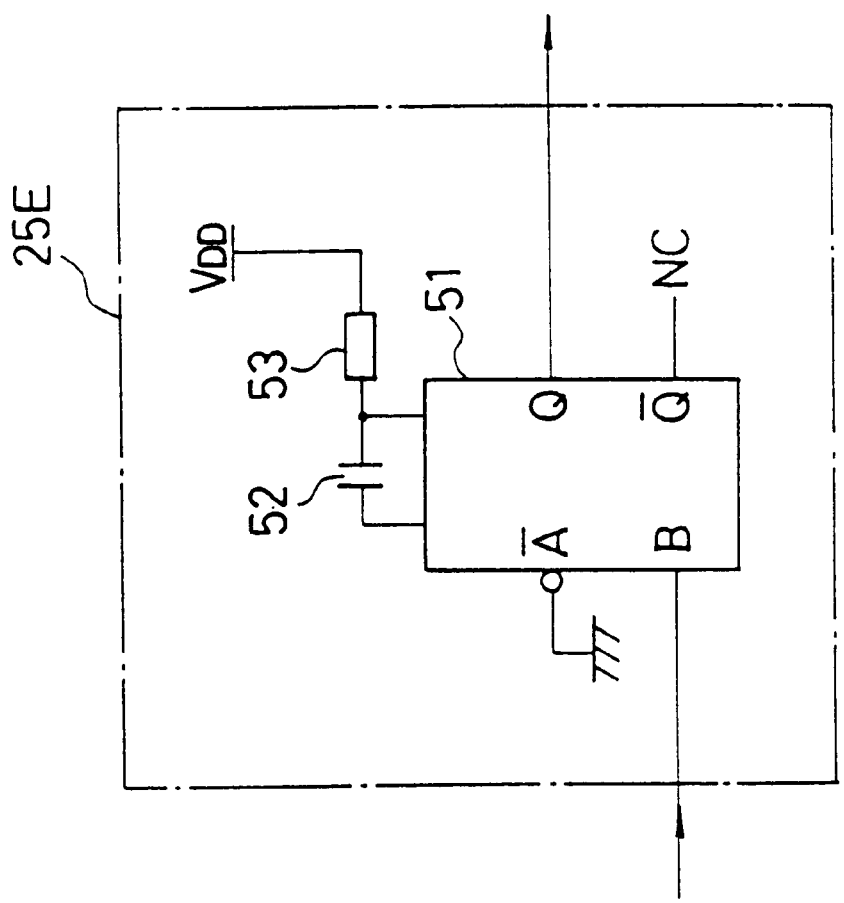
FIG. 9 is a circuit diagram of a demodulator used in the optical communications device according to the second embodiment of the present invention.
Figure 12:
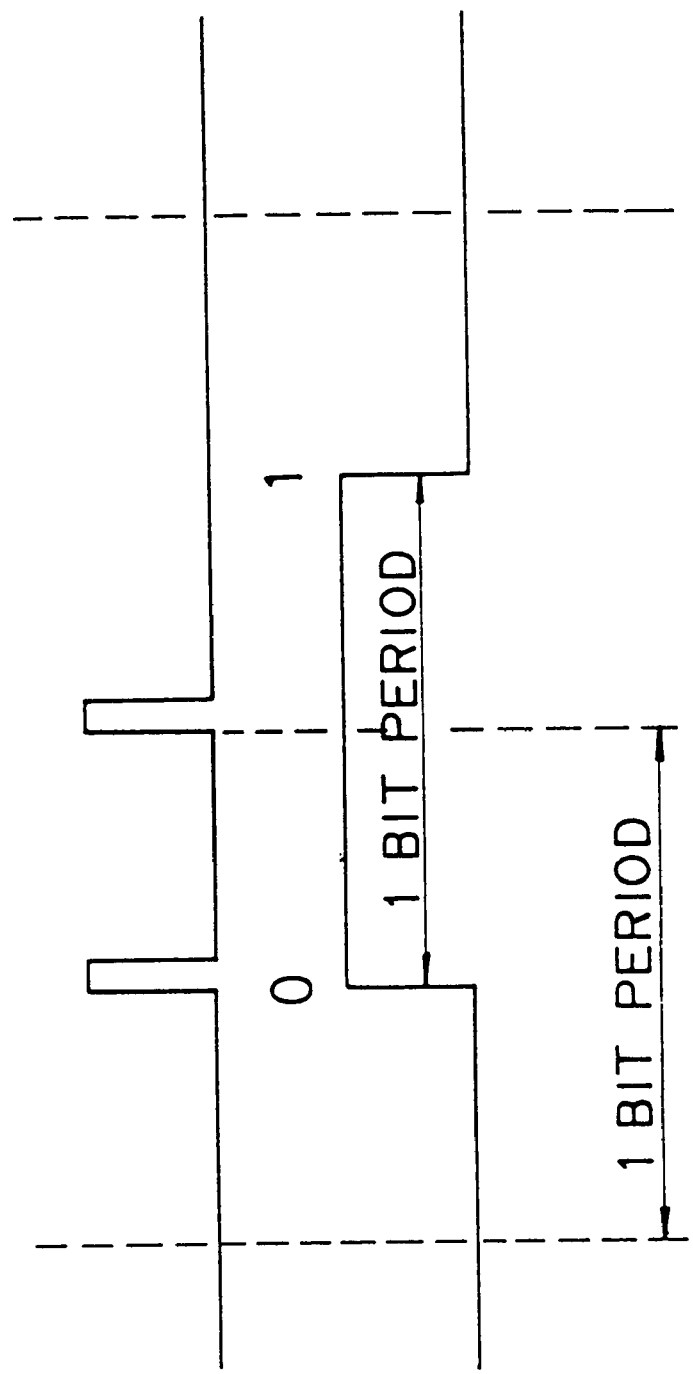
FIGS. 12A and 12B are timing diagrams for use in explanation of the operation of the demodulator shown in FIG. 9.

The demodulator 25E is constructed, as shown in FIG. 9, from a retriggerable monostable multivibrator 51, and is arranged to output an electrical pulse signal having a duration of half the bit period at each input pulse. That is, the multivibrator 51 is connected at its input $\overline{A}$ to a signal at a low level (ground potential) and responds to an input rising edge at its input B to provide at its output $\overline{Q}$ a pulse signal having a duration (half the bit period) determined by the capacitor 52 and the resistor 53. For example, when an electrical pulse signal of a narrow width shown in FIG. 12A is applied to the demodulator, a high-level signal of a duration equal to half the bit period starting at the rising edge of the input signal is output from the output $\overline{Q}$ of the multivibrator 51. If an electrical pulse signal is further applied at the bit boundary, then the multivibrator 51 will be retriggered by its rising edge. As a result, the multivibrator 51 continues to output the high-level signal as shown in FIG. 12B, resulting in a signal of a duration equal to the bit period. Thus, application of the electrical pulse signals of a narrow width as shown in FIG. 10D to the demodulator permits the original electrical pulse signals as shown in FIG. 10E to be recovered.

In a demodulator which, like the demodulator 25A shown in FIG. 7, inverts its output level at each input pulse signal, if noise should originate in the preceding photoelectrical conversion unit, the following problems may arise with that noise.

Figure 13:
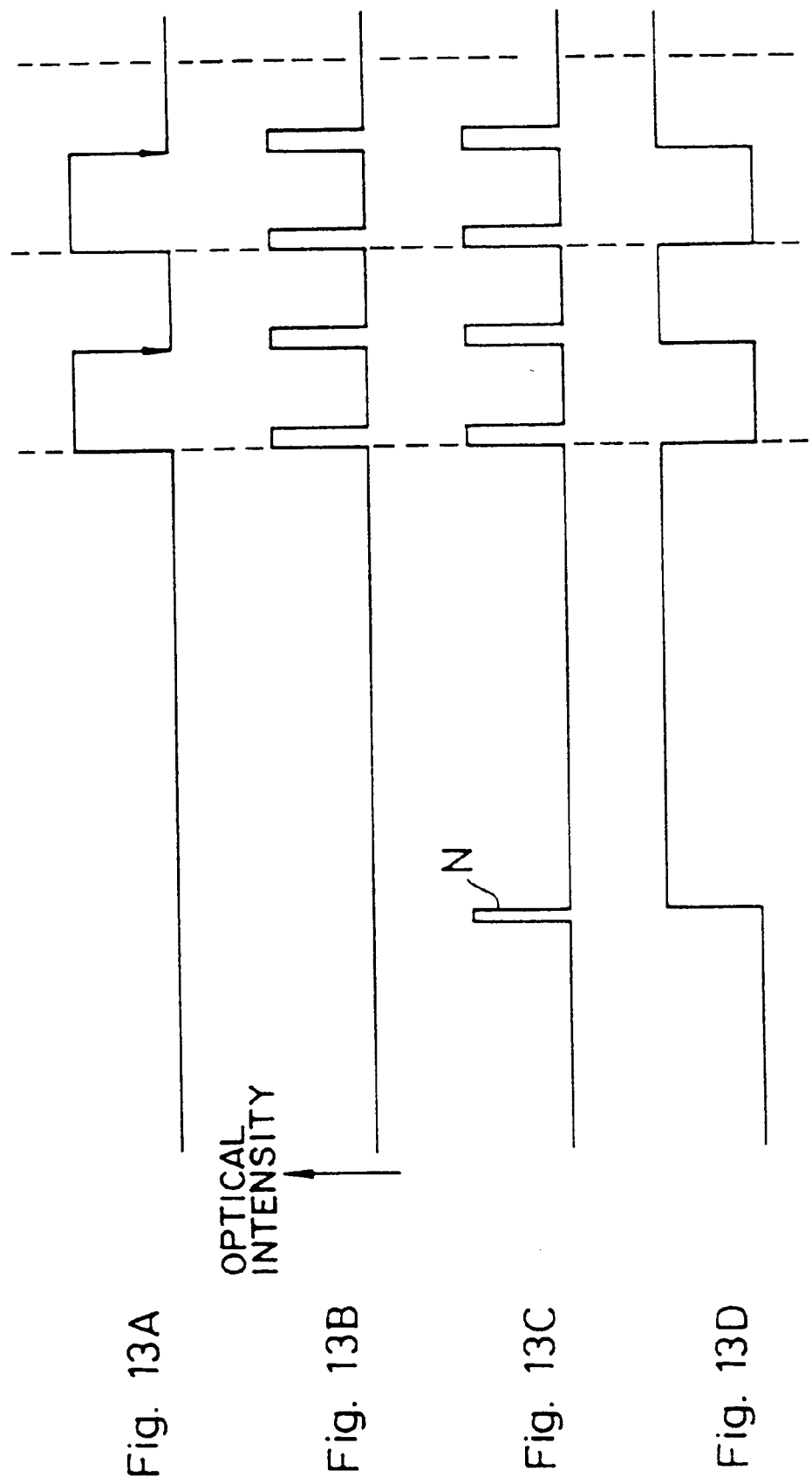
FIGS. 13A through 13D are timing diagrams for use in explanation of a malfunction due to noise originating in the demodulator of FIG. 9 during non-communication time.

In the first place, if a noise N is generated during non-communication time as shown in FIGS. 13A to 13D, it will invert the output of the demodulator 25A as shown in FIG. 13D, which, at a subsequent communication time, will cause a difference in signal level between the original electrical pulse signals (FIG. 13A) at the transmitting end and the corresponding output signals (FIG. 13D) of the demodulator. This means that normal receiving operation cannot be performed. In general, in optical communications, noise is regarded as being difficult to generate. It is thus considered that noise rarely occurs during the transmission of optical signals. However, it is considered that noise can occur in the photoelectrical conversion unit at the receiving end, by way of example. Here, such a case is illustrated. Such noise can also occur even after the transmitting end prematurely stops transmitting communications data for any reason.

Figure 14:
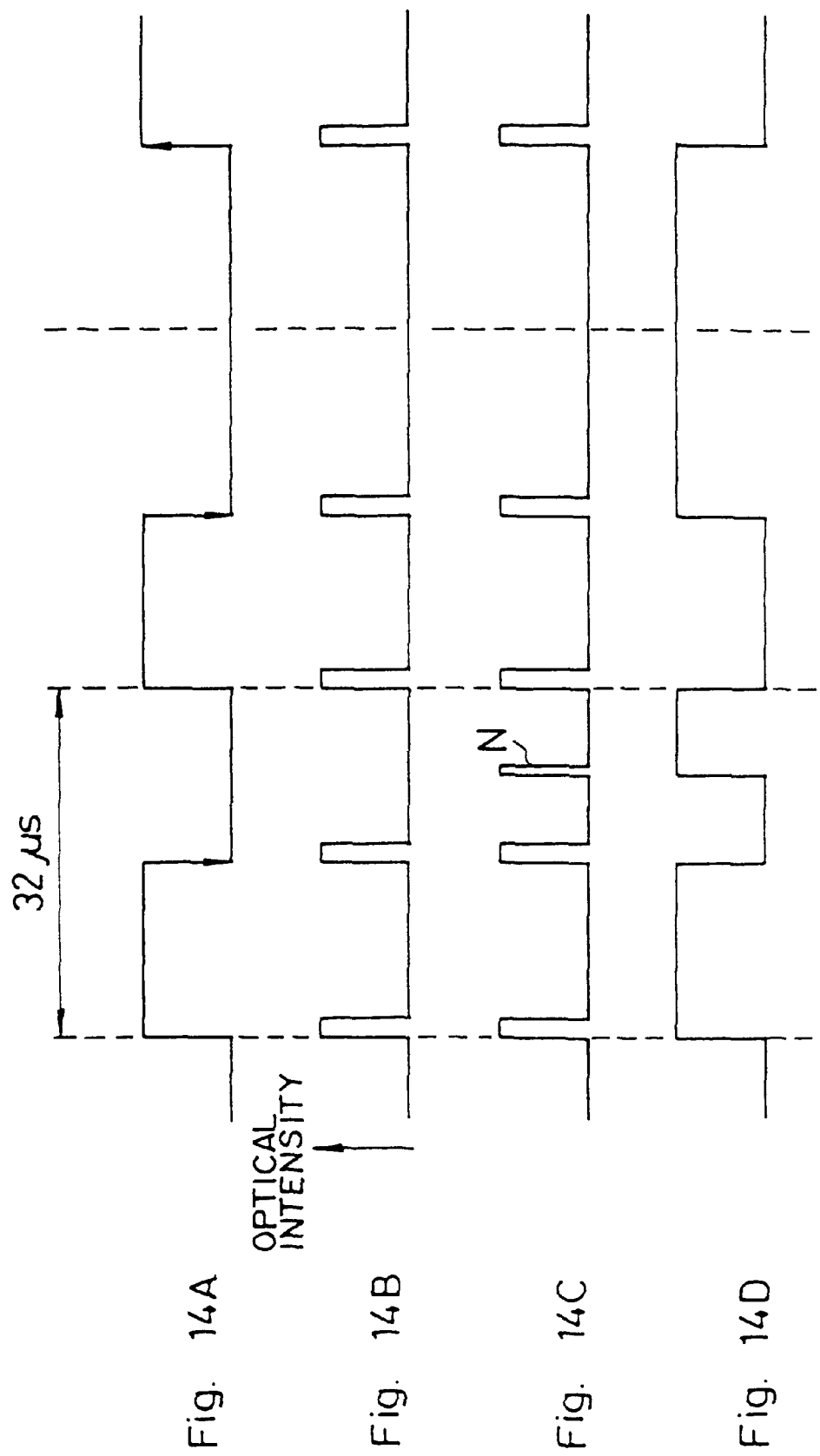
FIGS. 14A through 14D are timing diagrams for use in explanation of a malfunction due to noise originating in the demodulator of FIG. 9 during communication time.

Secondly, in the event that noise N occurs during communication as shown in FIGS. 14A to 14D, it will cause all the subsequent receiving output levels to be inverted as shown in FIG. 14D, as is the case with the non-communication time, failing to perform the normal receiving operation.

Hereinafter, embodiments which are intended to solve the problems associated with such noise will be described.

First, a third embodiment of the present invention will be described which is intended to solve the problem associated with noise originating during non-communication time. The third embodiment is the same in arrangement as the optical communications device of FIG. 4, except that a demodulator 25F that comprises a noise countermeasure means shown in FIG. 15 is used in place of the demodulator 25A.

Figure 15:
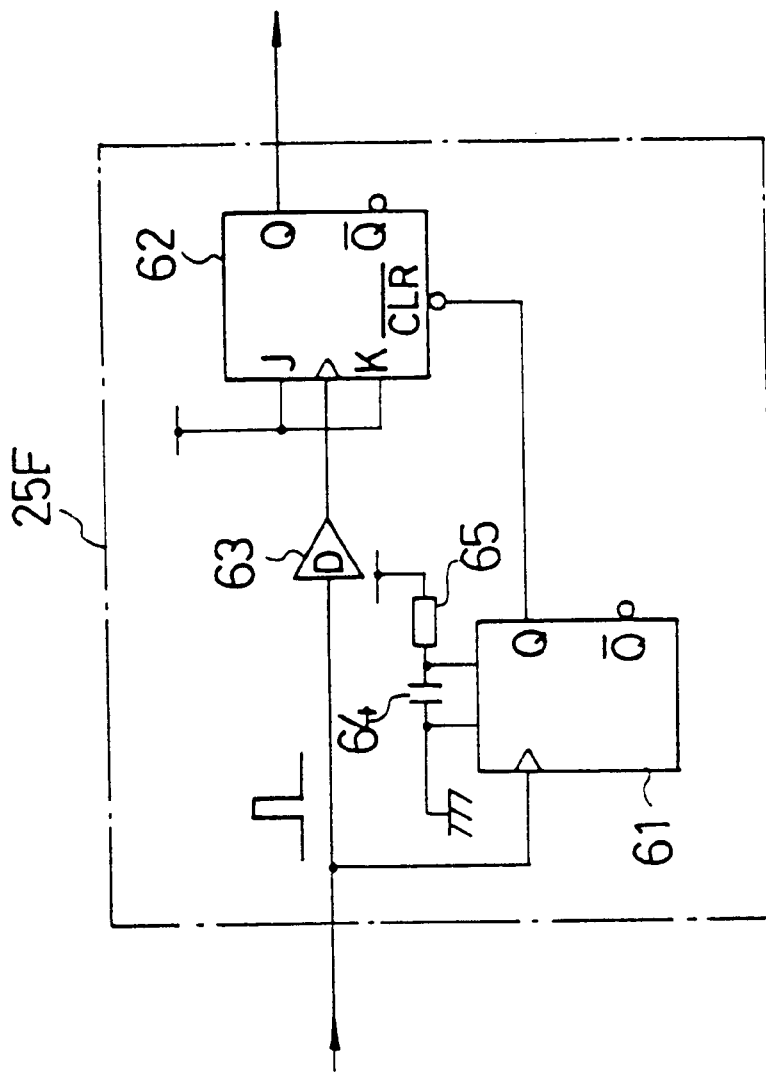
FIG. 15 is a circuit diagram of a modulator used in an optical communications device according to a third embodiment of the present invention.

The demodulator 25F is constructed, as shown in FIG. 15, from a retriggerable monostable multivibrator 61, a JK flip-flop 62, and a delay element 63. The monostable multivibrator 61, which normally provides at its output $\overline{Q}$ a low-level signal, responds to an input rising edge at its input to output a high-level signal having a fixed duration determined by the capacitor 64 and the resistor 65. The fixed duration should preferably be longer than the bit period (32 microseconds in the field bus) in transmission data, but shorter than 1.5 times the bit period. Here, for example, that it is set to an intermediate value of 40 microseconds. The JK flip-flop 62 is placed in the toggle state in which both the inputs J and K are at a high level, and inverts its output level (Q) at each rising clock-pulse edge at its clock input. The delay element 63 may comprise a delay line which delays an input signal by a very short time interval of, for example, one microsecond, and is provided to allow a rising input edge to be applied to the clock-pulse input of the flip-flop 62 after its clear terminal ($\overline{CLR}$) has been released.

Figure 16:
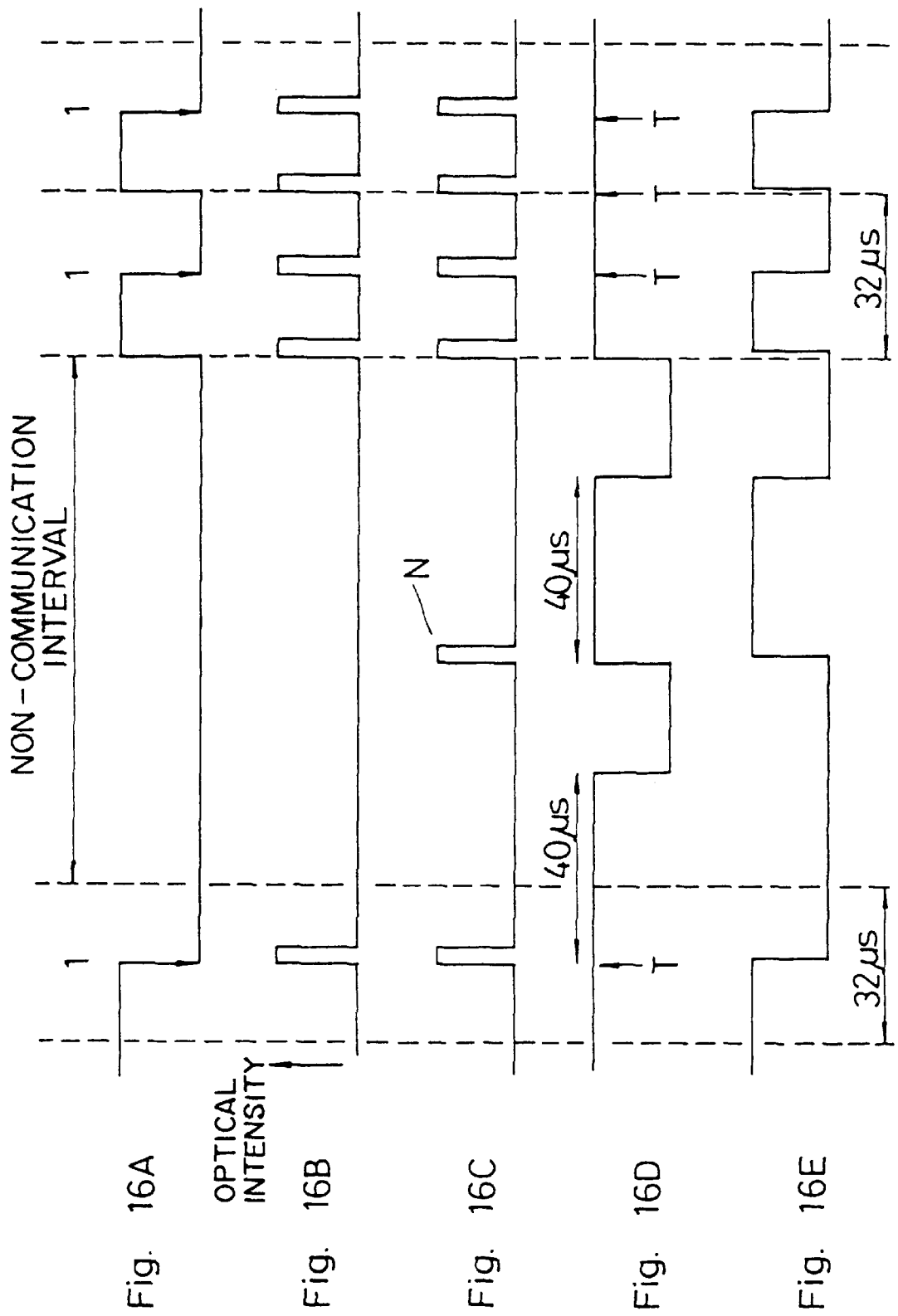
FIGS. 16A through 16E are timing diagrams for use in the operation of the optical communications device according to the third embodiment.

The operation of the noise countermeasure means demodulator 25F thus constructed will be described with reference to FIGS. 16A to 16E. FIG. 16C shows an input signal to the demodulator, FIG. 16D shows an output signal (Q) of the multivibrator 61, and FIG. 16E shows an output signal (Q) of the flip-flop 62, i.e., an output signal of the demodulator.

First, suppose that an external optical communications device sends the Manchester-coded electrical pulse signals shown in FIG. 16A, in the form of optical pulse signals of a narrow width shown in FIG. 16B. Then, the photoelectrical conversion unit at the receiving end produces electrical pulse signals corresponding in pulse width to the optical pulse signals as shown in FIG. 16C, which are applied to the demodulator 25F. By being triggered by the rising edge of an input signal, the multivibrator 61 of the demodulator 25F outputs a high-level signal of 40 microseconds in width. At the time when that high-level signal goes low, the flip-flop 62 is cleared. At communications time, the rising input edge appears at the input of the demodulator at intervals of 16 or 32 microseconds as shown in FIG. 16C. Thus, after the multivibrator 61 has been triggered by the first rising input edge to provide a high-level signal, it will be retriggered (T) before the high-level signal goes low. This retriggering operation is repeated; thus, the multivibrator 61 will continue to output the high-level signal during communication. As a result, the flip-flop 62 is permitted to invert its output level (Q) at each rising edge in the input signal (FIG. 16C) received via the delay element 63 without being cleared, thereby outputting such original electrical pulse signals as shown in FIG. 16E from the demodulator 25F. At the termination of communication, the multivibrator 61 is retriggered (T) by the last pulse rising edge, switching its output (Q) to a low level after a delay of 40 microseconds. Thus, the flip-flop 62 is cleared, so that the output of the demodulator 25F is maintained at a low level, which is the output level during non-communication time.

Suppose here that, during non-communication time, noise N originates in the input signal to the demodulator 25F as shown in FIG. 16C. Then, the multivibrator 61 is triggered by such noise, so that its output goes high as shown in FIG. 16D. Consequently, the output of the flip-flop 62 is also inverted to a high level as shown in FIG. 16E. However, 40 microseconds after being triggered, the output of the multivibrator 61 is switched to a low level as shown in FIG. 16D, thereby clearing the flip-flop 62. As a result, as shown in FIG. 16E, the output of the demodulator 25F also returns to a low level, which is the normal level during non-communication time. Thus, even if noise occurs during non-communication time, after a lapse of a predetermined period of time the output of the demodulator returns to the same low level as before the occurrence of noise, and then the reception of succeeding communications frames is started, which circumvents such a malfunction as shown in FIGS. 13A to 13D and allows the normal demodulating operation.

It was described previously that the duration of a high-level output signal of the multivibrator 61 should preferably be more than the bit period (32 microseconds) in transmission data, but less than 1.5 times the bit period (48 microseconds). The reason why that duration should preferably be less than 48 microseconds is that the-possibility exists that, if the duration is 48 microseconds or more, the demodulation may be continued with signals kept inverted. If the actual duration is set to about 40 microseconds, which is midway between 32 and 48 microseconds, a large allowance can be made for variations in the time constant determined by the capacitor 64 and the resistor 65.

Next, a description will be made of a fourth embodiment of the present invention which is intended to eliminate the problem associated with noise origination during communication time. This embodiment is the same in arrangement as the optical communications device of FIG. 4, except that a demodulator 25G that comprises a different noise countermeasure means shown in FIG. 17 is used in place of the demodulator 25A.

Figure 17:
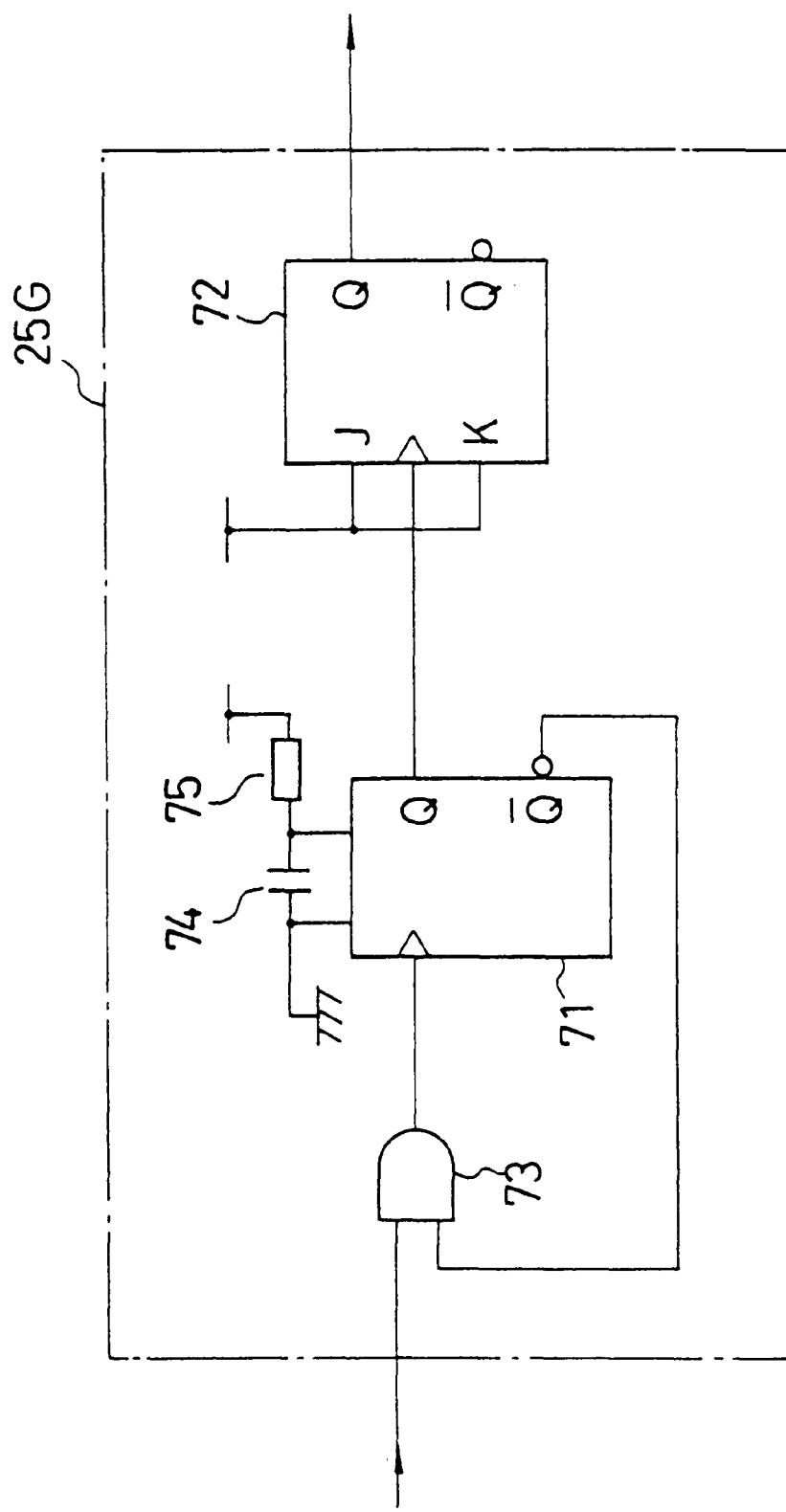
FIG. 17 is a circuit diagram of a demodulator used in an optical communications device according to a fourth embodiment of the present invention.

The demodulator 25G is constructed, as shown in FIG. 17, from a monostable multivibrator 71, a JK flip-flop 72, an AND gate 73, a capacitor 74, and a resistor 75. The monostable multivibrator 71 normally provides a low-level signal at its output Q. Upon receipt of a rising edge in an input signal to its input, the multivibrator provides a high-level signal having a constant duration determined by the capacitor 74 and the resistor 75. The duration should preferably be somewhat less than half the bit period in transmission data (16 microseconds in the field bus). Suppose here that the duration is set to, for example, 12 microseconds, taking into consideration an allowance for variations in the time constant determined by the capacitor 74 and the resistor 75. The JK flip-flop 72 has its inputs J and K connected together to a high-level potential, and inverts its output level at each rising edge in the input signal to its clock input. The AND gate is provided for preventing the multivibrator 71 from being retriggered while it is providing that high-level signal.

Figure 18:
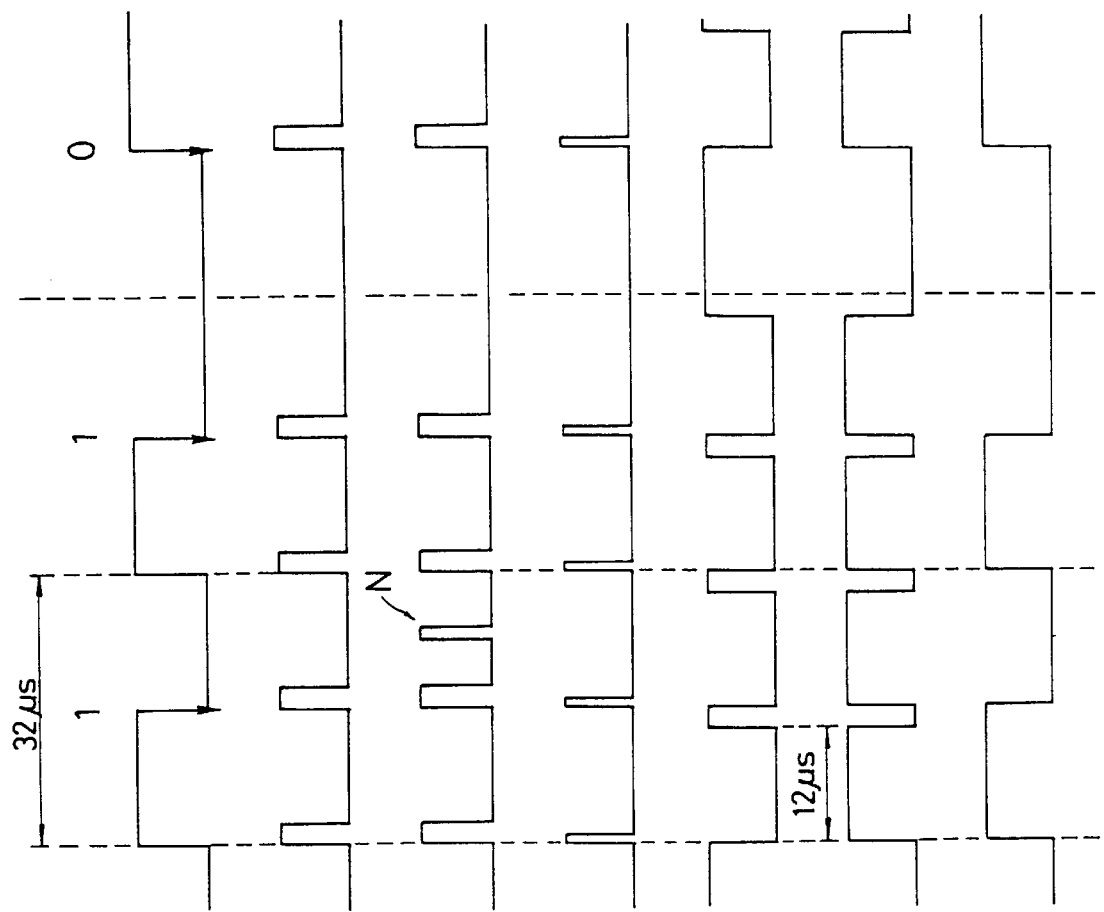
FIGS. 18A through 18G are timing diagrams for use in explanation of the operation of the optical communications device of the fourth embodiment.

The operation of the demodulator 25G thus arranged will be described below with reference to FIGS. 18A through 18G. FIG. 18C shows an input signal to the demodulator, FIG. 18D shows an output of the AND gate 73, FIG. 18E shows an inverted output ($\overline{Q}$) the multivibrator 71, FIG. 18F shows an output Q of the multivibrator 71, and FIG. 18G shows an output Q of the flip-flop 72, i.e., an output signal of the demodulator.

First, when an external optical communications device sends Manchester-coded electrical pulse signals shown in FIG. 18A in the form of optical pulse signals of a narrow pulse width shown in FIG. 18B, the optoelectrical conversion unit at the receiving end converts the optical pulse signals into corresponding electrical pulse signals as shown in FIG. 18C, which, in turn, are input to the demodulator 25G. The inverted output $\overline{Q}$ of the multivibrator 71 is maintained at a high-level potential prior to communication. When a signal rising edge is input to the demodulator at the start of communication, the output of the AND gate 73 goes high momentarily as shown in FIG. 18D, triggering the multivibrator 71. Then, the multivibrator 71 produces at its output Q a high-level signal having a duration of 12 microseconds as shown in FIG. 18F, and at its inverted output $\overline{Q}$ a low-level signal of a duration of 12 microseconds as shown in FIG. 18E. The output Q of the flip-flop 72 is inverted each time the output Q of the multivibrator 71 goes high, thus permitting such original electrical pulse signals as shown in FIG. 18G to be recovered.

The output of the AND gate 73 (FIG. 18D) goes low immediately after the inverted output $\overline{Q}$ of the multivibrator 71 (FIG. 18E) goes low, and remains at the low level regardless of the input signal level (FIG. 18C) until the inverted output $\overline{Q}$ of the multivibrator 71 is switched to a high level after a lapse of 12 microseconds. After a lapse of 12 microseconds, the AND gate output is maintained at the low level until the input signal (FIG. 18C) goes high. Thus, even if, as shown in FIG. 18C, noise N occurs in the input signal during the 12 microseconds period when the inverted output $\overline{Q}$ of the multivibrator (FIG. 18E) is maintained at the low level, that noise will not be allowed to pass through the AND gate 73. That is, the noise will not exert any influence on the output level of the flip-flop 72. More specifically, even if, within the 12 microseconds period after one electrical pulse signal (normal pulse signal) is input to the demodulator, another (or two or more) electrical pulse signal (noise) is input, any pulse other than the first pulse is overridden, so that the output of the flip-flop 72 is inverted only once. Therefore, a malfunction due to noise can be circumvented to provide normal demodulating operation.

Finally, a fifth embodiment of the present invention which is intended to circumvent malfunctions due to noise origination during communication time and/or non-communication time will be described. This embodiment is the same in arrangement as the optical communications device of FIG. 4, except that the demodulator 25A is replaced with a demodulator 25H shown in FIG. 19 that comprises another different noise countermeasure means.

Figure 19:
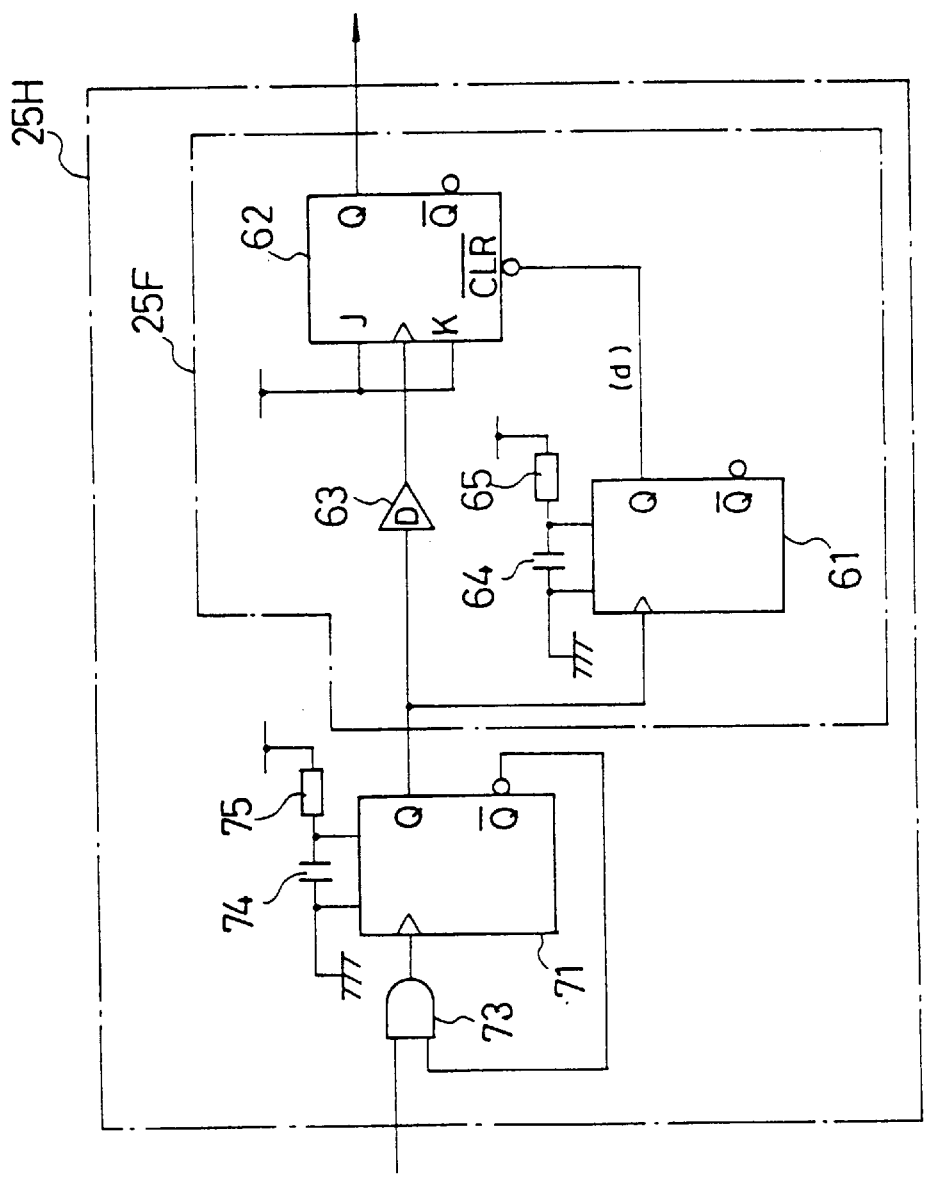
FIG. 19 is a circuit diagram of a demodulator used in an optical communications device according to a fifth embodiment of the present invention.

As is evident from FIG. 19, the demodulator 25H makes the combined use of the demodulator 25F of FIG. 15 and the demodulator 25G of FIG. 17, in such a way that the output Q of the multivibrator 71 in the demodulator 25G is coupled to the input of the demodulator 25F. It is clear that the demodulator 25H performs the combined operation of the demodulator 25F that takes measures against noise origination during non-communication time, and the demodulator 25G that takes measures against noise origination during communication time accordingly; a detailed description of the demodulator 25H is deemed unnecessary. Thus, according to the present embodiment, even when noise originates during non-communication time as shown in FIG. 16C, and/or when noise originates during communication time as shown in FIG. 18C, the normal demodulation operation, free of malfunctions due to such noise, can be ensured.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical communications device comprising a transmission unit for transmitting binary-coded electrical pulse signals to an external optical communications device in the form of optical pulse signals, said transmission unit comprising:

modulation means for producing an electrical pulse signal that is narrow in pulse width for each bit in said binary-coded electrical pulse signals when said binary-coded electrical pulse signal remains at a high level at the beginning of a succeeding bit period; and electro-optic conversion means for converting said electrical pulse signal into an optical pulse signal that is narrow in pulse width.

2. The optical communications device according to claim 1, further comprising a receiving unit for converting optical pulse signals received from an external source into electrical pulse signals, said receiving unit comprising:

opto-electrical conversion means for converting optical pulse signals that are narrow in pulse width into electrical pulse signals that are narrow in pulse width; and demodulation means for recovering original binary-coded electrical pulse signals from said electrical pulse signals that are narrow in pulse width.

3. The optical communications device according to claim 2, wherein said demodulation means provides a high-level electrical pulse signal of a fixed pulse width each time an electrical pulse signal that is narrow in pulse width is output from said opto-electrical conversion means.

4. An optical communications device comprising a receiving unit for receiving an optical pulse signal which is obtained by producing an electrical pulse signal that is narrow in pulse width for each bit in a binary-coded electrical pulse signal when said binary-coded electrical pulse signal remains at a high level at the beginning of a succeeding bit period and converting said electrical pulse signal that is narrow in pulse width into an optical pulse signal that is narrow in pulse width, said receiving unit comprising:

opto-electrical conversion means for converting an optical pulse signal that is narrow in pulse width into an electrical pulse signal that is narrow in pulse width; and demodulating means responsive to said electrical pulse signal that is narrow in pulse width for recovering an original electrical pulse signal.

5. The optical communications device according to claim 4, wherein said demodulation means provides a high-level electrical pulse signal of a fixed pulse width each time an electrical pulse signal that is narrow in pulse width is output from said opto-electrical conversion means.

6. An optical communications device comprising a transmission unit for transmitting binary-coded electrical pulse signals, which have a constant bit period and change at a center of the bit period from a high level to a low level or from a low level to high level according to bit data, to an external optical communications device in the form of optical pulse signals, said transmission unit comprising:

modulation means for producing, at each rising edge of said binary coded electrical pulse signals and at a bit boundary when one of said binary-coded electrical pulse signals remains at a high level across the bit boundary, an electrical pulse signal that is narrow in pulse width; and electro-optic conversion means for converting each of said electrical pulse signals into optical pulse signals that are narrow in pulse width;

said transmission unit producing no electrical pulse signal at a falling edge of said binary-coded electrical pulse signals.

7. The optical communications device according to claim 6, further comprising a receiving unit for converting optical pulse signals received from an external source into electrical pulse signals, said receiving unit comprising:

opto-electrical conversion means for converting optical pulse signals that are narrow in pulse width into electrical pulse signals that are narrow in pulse width; and demodulation means for producing a high-level electrical pulse signal having a pulse width of half the bit period each time one of the electrical pulse signals that are narrow in pulse width is output from said opto-electrical conversion means to recover original binary-coded electrical pulse signals.

8. An optical communications system comprising first and second optical communications devices:

said first optical communications device comprising a transmission unit for transmitting binary-coded electrical pulse signals to a second optical communications device in the form of optical pulse signals, said transmission unit comprising:

modulation means for producing an electrical pulse signal that is narrow in pulse width for each bit in a binary-coded electrical pulse signal when said binary coded electrical pulse signal remains at a high level at the beginning of a succeeding bit period; and electro-optic conversion means for converting an electrical pulse signal that is narrow in pulse width into an optical pulse signal that is narrow in pulse width;

said second optical communications device comprising:

a receiving unit for converting optical pulse signals sent from said first optical communications device into electrical pulse signals, said receiving unit comprising:

opto-electrical conversion means for converting optical pulse signals that are narrow in pulse width sent from said transmission unit in said first optical communications device into electrical pulse signals that are narrow in pulse width; and demodulating means responsive to an electrical pulse signal that is narrow in pulse width for recovering an original electrical pulse signal.

* * * * *